United States Patent
Shaffer et al.

(10) Patent No.: US 6,240,170 B1
(45) Date of Patent: *May 29, 2001

(54) METHOD AND APPARATUS FOR AUTOMATIC LANGUAGE MODE SELECTION

(75) Inventors: Shmuel Shaffer, Palo Alto; William Joseph Beyda, Cupertino, both of CA (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,953

(22) Filed: Jun. 20, 1997

(51) Int. Cl.[7] .............................. H04M 1/56; H04M 15/06
(52) U.S. Cl. .................. 379/142; 379/88.05; 379/88.06; 709/218; 704/8
(58) Field of Search .......................... 379/67–70, 71–72, 379/76, 142, 121, 127, 88.05, 88.06, 52, 114, 115; 709/203, 219, 246, 218, 229, 228; 395/200.33, 200.49, 200.76, 200.48, 200.59; 704/3.8

(56) References Cited

U.S. PATENT DOCUMENTS

| 4,985,913 | | 1/1991 | Shalom et al. . | |
|---|---|---|---|---|
| 5,392,343 | * | 2/1995 | Davitt et al. | 379/212 |
| 5,440,615 | * | 8/1995 | Caccuro et al. | 379/67 |
| 5,875,422 | * | 2/1999 | Eslambolchi et al. | 704/3 |
| 5,940,806 | * | 8/1999 | Danial | 705/26 |
| 5,944,790 | * | 8/1999 | Levy | 709/218 |

FOREIGN PATENT DOCUMENTS

| 44 30 991 A 1 | | 3/1996 | (DE) . |
|---|---|---|---|
| 0 455 912 A2 | | 11/1991 | (EP) . |
| 0 567 135 A1 | | 10/1993 | (EP) . |
| 0 719 019 A2 | | 6/1996 | (EP) . |
| 4265045 | * | 9/1992 | (JP) . |
| WO 95/20859 | | 8/1995 | (WO) . |
| WO 97/24862 | | 7/1997 | (WO) . |

* cited by examiner

Primary Examiner—Duc Nguyen

(57) ABSTRACT

A method and apparatus for selecting a language to communicate with a user of a voice mail or computer system. A decoder decodes an automatic number identification (ANI) Caller_ID code or a user ID code to determine the telephone number or identity of the user. A language database stores a hierarchy of languages to be presented to the user based on the location or identity of the user. The user is prompted to confirm the language selection made. If the language is not appropriate, then the next language in the hierarchy is selected.

5 Claims, 3 Drawing Sheets

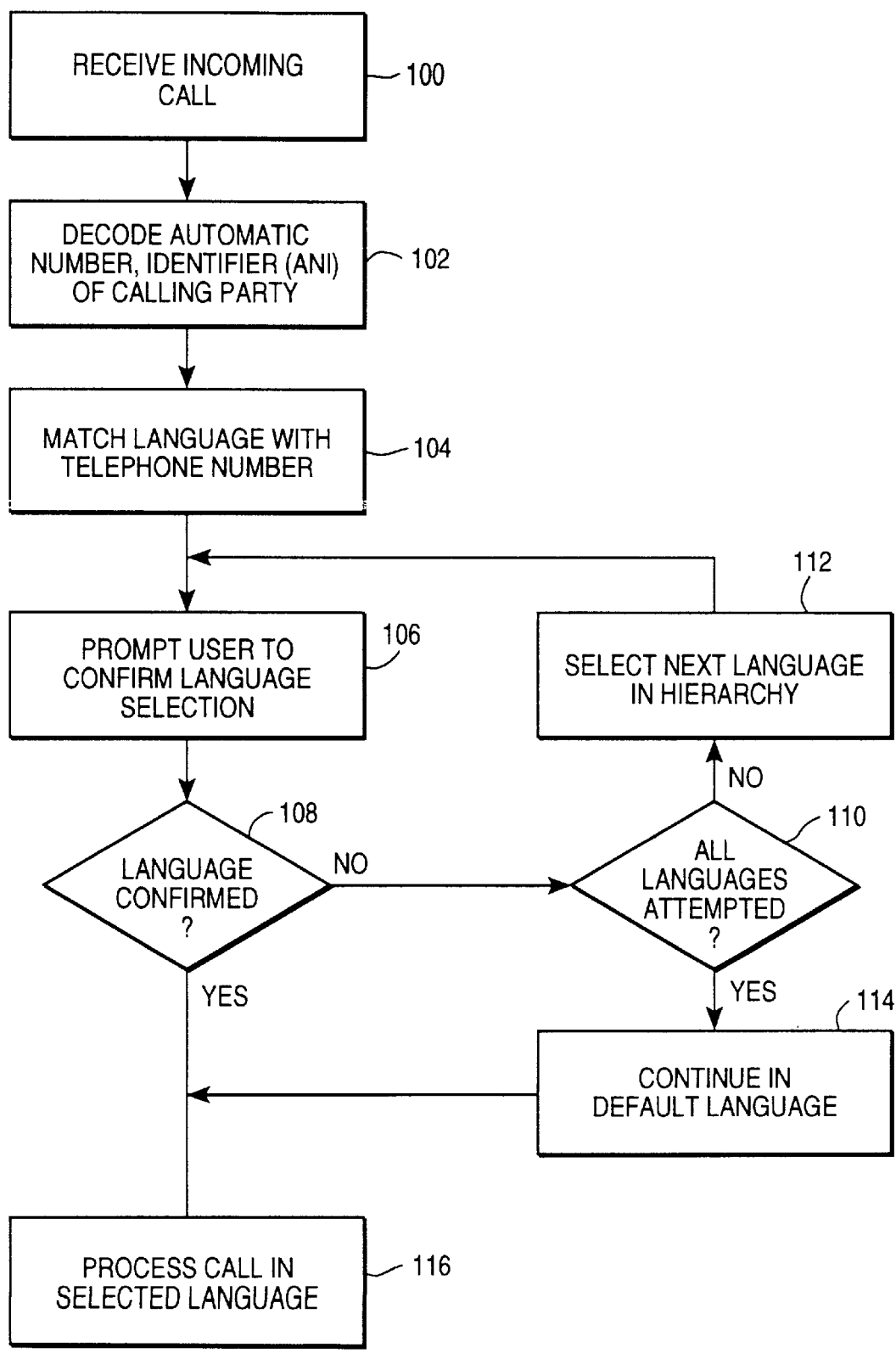
FIG_2

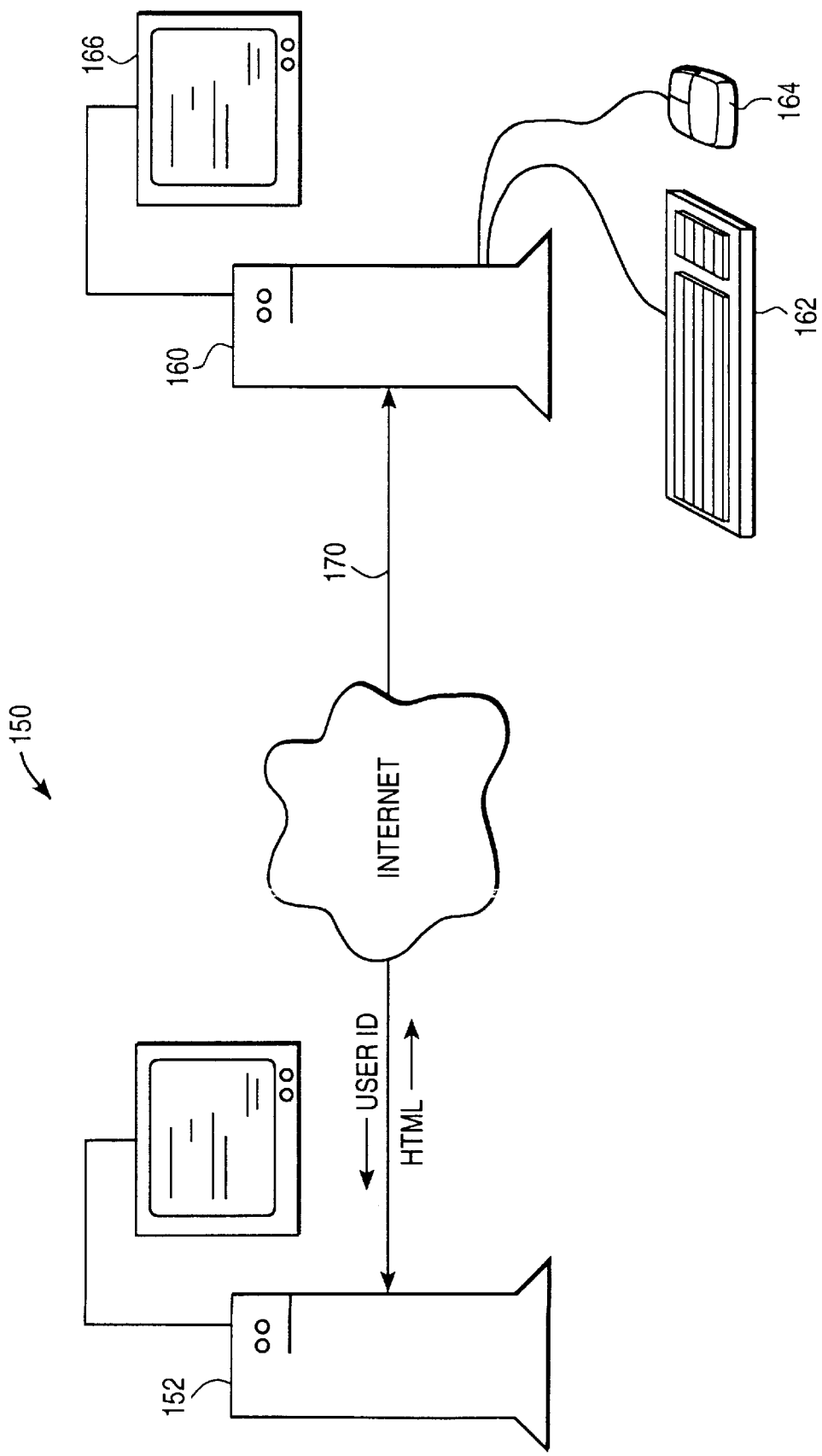
FIG_3

METHOD AND APPARATUS FOR AUTOMATIC LANGUAGE MODE SELECTION

FIELD OF THE INVENTION

The present invention relates to telecommunication systems in general, and in particular to voice processing systems or Internet servers having multiple language capabilities.

BACKGROUND OF THE INVENTION

As companies conduct ever-increasing amounts of business on a global scale, there is a need to accommodate the various languages of their customers or clients. One example of a system in which it is desirable to greet customers in their native language is a voice processing or voice mail system. In current voice mail systems, a caller is greeted and given instructions regarding how to leave a message for an intended party in a default language that is usually English. If callers do not want to hear the instructions in the default language, they may be requested to select another language by responding at the appropriate time to a prompt that asks what language they would like or by entering one or more keystrokes on a touch-tone telephone keypad. Both of these solutions require extensive user participation to select a language that is other than the default language. In addition, if the callers do not understand the default language, they may not understand how the language selection may be changed.

To facilitate the language needs of a diverse customer and client base, there is a need for a voice processing system that can more easily identify the preferred language of a calling party without extensive user intervention.

SUMMARY OF THE INVENTION

To improve the ability of voice processing systems to handle various languages of calling parties, the present invention optimizes the selection of a language to greet a calling party based on the location or identity of the calling party. In particular, a call processing system of the present invention reads a code that is added to a call by the telephone company and is indicative of the location or identity of the calling party. The code is analyzed by the call processor to match a language that is most likely to be used by the calling party. The calling party is prompted to confirm that the language selected is proper. If not, additional language options are presented in a hierarchy that is dictated by the location or identity code.

The present invention can also be used in Internet applications whereby a server computer creates a "Web page" in a language that is controlled by an address of a user. The server computer preferably maintains a database that matches the language selected by a user with the address of the user.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a flowchart of the steps performed by the voice mail system of the present invention to select a language to be used in communicating with the user; and FIG. 3 is a diagram of a computer system that creates an Internet site in a language that is dependent upon the identity of a user.

DETAILED DESCRIPTION OF THE PREFERRED EMBODIMENT

Figure 1:
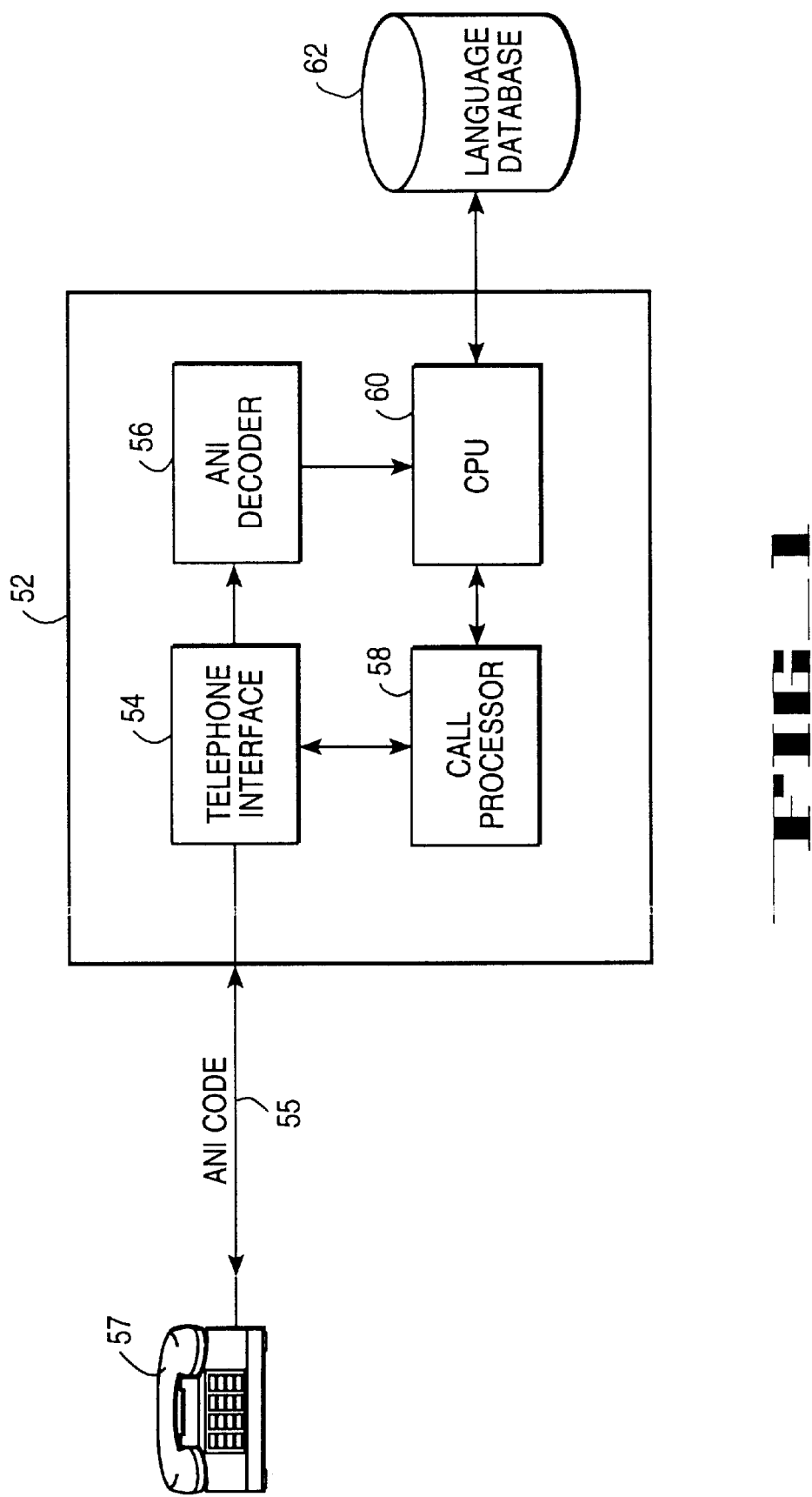
FIG. 1 is a block diagram of a voice mail system according to the present invention.

As indicated above, the present invention is a system for communicating with a user in a language that is selected based on the caller's identity and/or location.

FIG. 1 illustrates a first embodiment of the invention that is incorporated into a voice mail system 52. The voice mail system includes a telephone interface 54 that receives calls on a number of incoming telephone lines 55. The telephone interface 54 is coupled to a call processor 58 that gives instructions to a caller enabling them to connect to a desired party or to leave a message in the party's voice mailbox. The operation of the call processor 58 is controlled by a central processing unit 60. The construction and operation of the voice mail system 52 is considered to be well-known to those of ordinary skill in the art and therefore will not be discussed further except as it relates to the present invention.

As indicated above, one of the problems with existing voice mail systems is that the user is not greeted in their native language without having to answer numerous questions or step through menus using a touch-tone keypad. The present invention is designed to reduce the effort required from a user in order to operate the voice mail system in his to her native language.

The voice mail system 52 includes decoder 56 that is coupled to the telephone line interface 54. Decoders are commonly found in ISDN compatible telecommunications equipment, such as the Hicom 300E PBX, produced by Siemens Business Communications of Santa Clara, California. The decoder interprets a code that is added to a telephone call by a telephone company in order to identify the telephone number and/or the identity of the caller. In the presently preferred embodiment of the invention, the decoder decodes an automatic number identifier (ANI) code. The ANI code provides the telephone number of a telephone 57 from which a call to the voice mail system is made. The decoder 56 decodes the ANI code and provides the telephone number of the telephone 57 to the central processing unit 60. The central processing unit then queries a language database 62 that associates the telephone number of the calling party with a particular language. It will be appreciated that the present invention is not limited to decoding the ANI code and that other codes that are indicative of the identity of the caller, such as a Caller_ID code, could also be used.

The language database 62 associates a language with a particular telephone number based on an analysis of the telephone number of the calling party. For example, the ANI code decoded by the decoder 56 typically includes a country code, an area code, and a prefix that designates a particular geographic location. Based on an analysis of the telephone number of the called party (described below), the central processing unit queries the language database 62 for the most likely language to be used by the calling party. Once an initial language is selected, the central processing unit 60 provides instructions to the call processor 58 to answer the calling party in the selected language. The user is then given a chance to confirm the language selection. If the user does not confirm the language, then the language database is queried for a second language based on a hierarchy that is determined by the telephone number of the calling party. This process continues until the caller accepts the selected language.

FIG. 2 is a flow chart of the steps performed by the present invention to answer a calling party in his or her native language. Beginning at a step 100, the voice mail system receives an incoming call. At a step 102, the decoder decodes the automatic number identifier (ANI) code to determine the telephone number of the calling party. At a step 104, the number of the calling party is parsed for the country code, the area code, and a city or prefix code. These codes are then used by the language database to associate a particular language with the telephone number of the calling party.

At a step 106, the voice processor prompts the user in the selected language to confirm the language selection being used. For example, the voice mail system may say "to continue in English, press the star key or answer 'yes'". At a step 108, it is determined whether the user has confirmed language selection. If not, processing proceeds to a step 110, whereby the computer system determines whether all languages in a hierarchy have been attempted. If not, then the computer system selects the next language in the hierarchy at a step 112 and processing returns to step 106 to prompt the user to confirm the language selection.

If all languages have been attempted at step 110, processing proceeds to step 114, whereby the call processing continues in a default language, which is typically English. Alternatively, the caller could be routed to a human operator in order to aid the caller at this point. When either the caller has confirmed the selected language at step 108, or the voice mail system is operating in the default language or handled by an operator, the call is processed in the selected language at a step 116.

As indicated above, the hierarchy of languages stored in the language database is preferably determined by the telephone number of the calling party. Generally, the language selected is determined by the country code contained in the telephone number of the calling party. However, in some instances, a country may have more than one official language or more than one dialect of a common language, in which case, the most popular language for the country is first tried. If the user does not confirm the language selection, then the area or region code of the number is analyzed to determine the most popular language in that region. If the user still does not confirm the language presented, the hierarchy stored in the language database is programmed to try different languages based on the relative percentage of people who speak a given language in that particular area.

As an example of the logic employed to select a language for a caller, assume a call is received from Canada. The central processing unit decodes the country code and recognizes that Canada is a bilingual country and therefore determines whether the area code of the telephone number indicates the call is originating from an English or French speaking part of Canada. If the call originates from Toronto, then English would be tried first, followed by French. Alternatively, if the call originates from Quebec, then French would be tried first followed by English. If neither selection was acceptable then the language database is programmed to store the most likely language based on the relative population of different language speakers in the area identified by the prefix or city code of the calling number. For example, if a call originated from Vancouver, British Columbia, then Mandarin Chinese may be the language that is tried after English and French.

As indicated above, the present invention is not limited to using the ANI code for selecting the language that is used to communicate with a caller. For example, other codes such as the Caller_ID code that identify a particular user could also be used. In this case, the language database stores a language for a particular caller. The language database is built up based on the language selected by the caller on a previous call to the voice mail system. As yet another alternative, the present invention can also utilize the telephone number of the called party to select the language. For example, a company may have special extensions designated to callers from various parts of the world. When these extensions are dialed, the language database stores the language in a hierarchy that is most commonly used by callers from that particular part of the world.

The present invention is not limited to telephone call processing systems but could also be used in Internet computer systems. On an Internet server that can be accessed from remote computers disposed throughout the world, it is desirable to present the information in the language of the subscriber.

FIG. 3 illustrates a remotely accessible computer system that is programmed according to the present invention. The computer system 150 comprises a server computer 152 that operates as an Internet gateway to provide information to remote users. For example, a remotely located computer 160 of the type having a conventional keyboard 162, pointing device such as a mouse 164, and monitor 166 operates communication software that allows the remote computer to access the server computer 152. The remote computer 160 may be located anywhere in the world.

To ensure that information provided from the server computer 152 is in a language that is understandable by the user of the remote computer 160, the server computer 152 analyzes a user ID that is transmitted over a communication link 170 from the remote computer. The server computer 152 analyzes the user ID and queries a language database for a corresponding language hierarchy that might be used to communicate with the user. The server computer 152 then generates hypertext markup language (HTML) statements or other commands in the selected language to be transmitted to the remote computer 160. The remote computer then generates a display or "Web page" in the selected language. In the Web page, the user is presented with a dialog box or other control that asks them to confirm the language selected. If the language is unacceptable, then another language is selected based on the hierarchy described above.

As will be appreciated, the user ID transmitted from the remote computer 160 is not often indicative of the user's geographic location. Therefore, the language database must be constructed based on prior language selections made by users or by parsing the user ID for information concerning the Internet provider to which the remote computer is connected and by storing the languages most often selected by users of that service provider in the language database.

As can be seen, the present invention allows users to interact with electronic communication systems in a preferred language that is selected according to the users location or identification.

What is claimed is:

1. A method of operating a remotely accessible computer system to communicate electronically with a user in a selected language comprising:
   (a) receiving a request from a user to connect to a computer system over a wide area computer network;
   (b) determining an identity of the user;
   (c) based on the identity of the user, identifying a stored list of languages to try;
   (d) selecting a next language from said stored list;

(e) generating a prompt that asks the user to confirm whether the selected language is acceptable;

(f) if the user does not confirm the selection of the language, repeating steps (d) and (e) if untried languages remain in said stored list, and otherwise selecting a default language; and (g) transmitting information over the wide area computer network in the selected language to communicate electronically with the user.

2. The method of claim 1, wherein the step of transmitting information over the wide area computer network in the selected language to communicate electronically with the user comprises:

generating hypertext markup language statements in the selected language; and transmitting the hypertext markup language statements to a computer operated by the user to communicate with the user over the wide area computer network.

3. The method of claim 2, wherein the step of using the selected language to communicate electronically with the user further comprises:

receiving the hypertext markup statements; and generating a display in the selected language on the computer operated by the user.

4. The method of claim 1, wherein the stored list is further based on prior language selections made by the user.

5. The method of claim 1, wherein the stored list is further based on an identity of a service provider through which the user accesses the wide area computer network.

* * * * *